United States Patent [19]

Rougeron et al.

[11] 4,434,958

[45] Mar. 6, 1984

[54] METHOD OF CONSTRUCTION FOR A CONTAINER WITH A SYMMETRICAL LOBED STRUCTURE AND CONTAINER CONSTRUCTED ACCORDING TO THE SAID PROCESS

[75] Inventors: Michel Rougeron, Toulouse; Jacques Simon, Vigoulet-Auzil, both of France

[73] Assignee: Centre National d'Etudes Spatiales, Paris, France

[21] Appl. No.: 184,448

[22] Filed: Sep. 5, 1980

[30] Foreign Application Priority Data

Sep. 6, 1979 [FR] France ............................. 79 22303

[51] Int. Cl.³ .............................................. B64B 1/58
[52] U.S. Cl. ...................................... 244/126; 244/31
[58] Field of Search .................................. 244/31-33, 244/126, 127, 125, 117 R, 119, 133; 220/71, 1 B; 52/2

[56] References Cited

U.S. PATENT DOCUMENTS

| 2,106,494 | 1/1938 | Debor ................................. 220/71 |
| 2,313,997 | 3/1943 | Jackson .............................. 220/1 B |
| 2,679,224 | 5/1954 | Sturtevant ............................ 244/31 |
| 2,919,082 | 12/1959 | Winzen . | |
| 3,041,013 | 6/1962 | Froehlich . | |
| 3,109,612 | 11/1963 | Winker et al. ......................... 244/31 |
| 3,182,932 | 5/1965 | Winkler . | |
| 3,311,328 | 3/1967 | Slater . | |
| 3,519,530 | 7/1970 | Struble, Jr. ........................... 244/31 |
| 3,773,279 | 11/1973 | Wright ................................. 244/31 |
| 3,927,244 | 12/1975 | Ogura et al. ................. 244/133 U X |
| 4,077,588 | 3/1978 | Hurst ................................... 244/126 |
| 4,125,233 | 11/1978 | Winker et al. ........................ 244/33 |
| 4,223,797 | 9/1980 | Skakunov ........................... 220/1 B |

FOREIGN PATENT DOCUMENTS 2447246  4/1976  Fed. Rep. of Germany .

OTHER PUBLICATIONS

Chemical Engineering, vol. 58, No. 12, Dec. 1951, "14 Lobes Make a Big Sphere," p. 220.
Lever, *The Plastics Manual*, Scientic. Press Ltd., London, England, 1966, pp. 139, 140, 142, 143.

*Primary Examiner*—Galen L. Barefoot
*Attorney, Agent, or Firm*—Neil F. Markva

[57] ABSTRACT

The invention concerns a spheroid container flattened at either pole. The structure is made from gores assembled along their edges. Meridional mono-directional reinforcements are fixed at intervals to the connecting lines of the gores. The gores are made of a material with a low elastic modulus and a high capacity for plastic elongation and the meridional reinforcements from a material with a high elastic modulus. An overpressure inside the structure causes it to take on the shape of a lobed spheroid, flattened at either pole. Application for closed balloons and pressurized containers.

10 Claims, 2 Drawing Figures

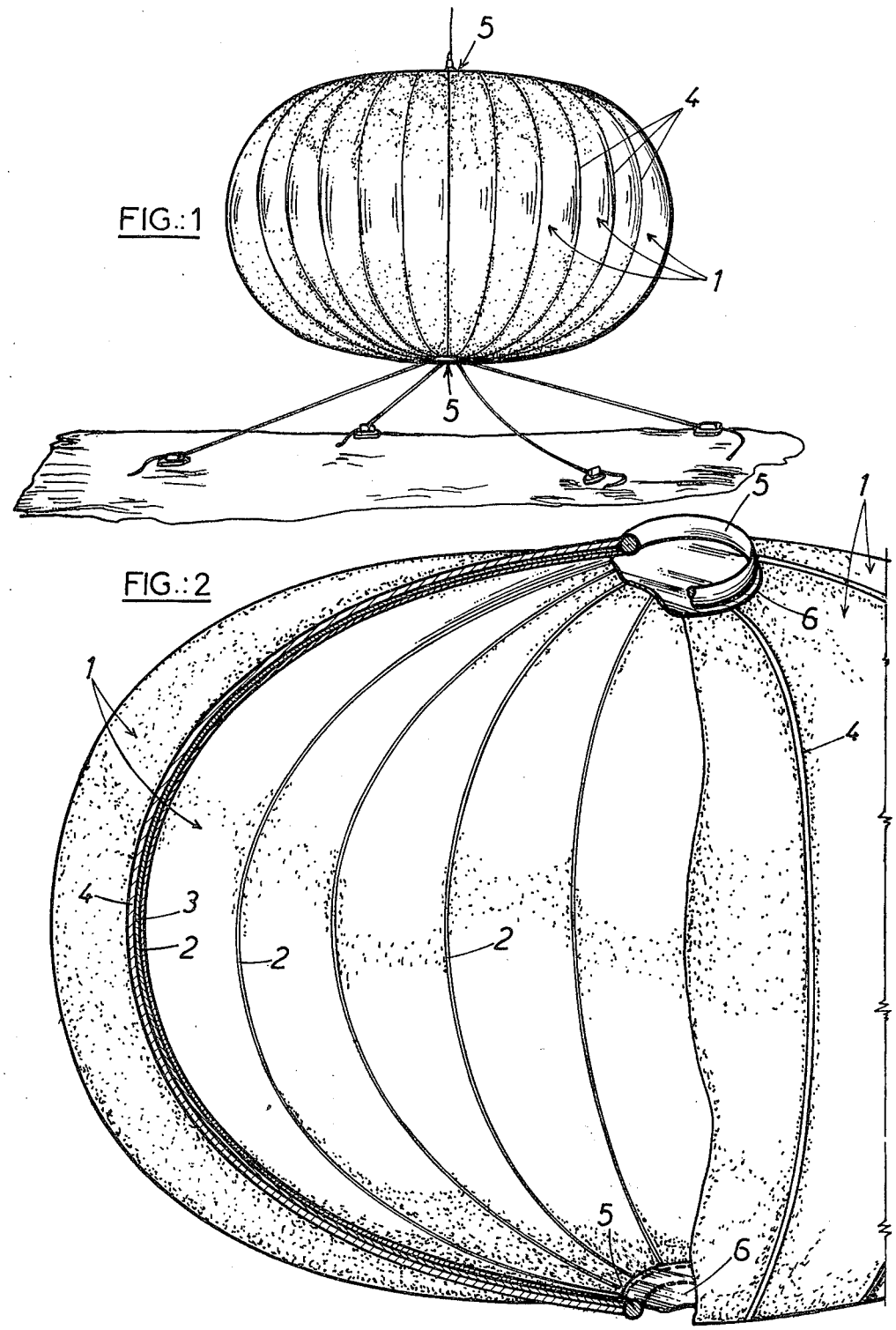

METHOD OF CONSTRUCTION FOR A CONTAINER WITH A SYMMETRICAL LOBED STRUCTURE AND CONTAINER CONSTRUCTED ACCORDING TO THE SAID PROCESS

FIELD OF THE INVENTION

The invention relates to pressurized containers having a lobed symmetrical structure, intended for gases or liquids in particular.

BACKGROUND OF THE INVENTION

Symmetrical, spherical or nearly spherical containers are known, which according to their use may be formed from a skin of supple and resistant material, such as the envelope used in airships, or from a shell of rigid and resistant material, as in spherical tanks used for containing gases under pressure or gases of which the liquid phase cannot be maintained in equilibrium except under pressure.

In the case of an airship, and more particularly a pressurized balloon, i.e. a ballon of which the closed envelope is sufficiently resistant to accept a certain pressure, and which, consequently, its volume remaining constant, is capable of flying for several months at a steady level, the best possible ratio between the resistance and weight of the envelope and equally the best possible air-tightness is sought. Until the present time, these aims were achieved by a spherical balloon made of polyester film.

In the case of tanks designed to contain a gas under pressure or a gas in isobaric equilibrium with its liquid, the spherical shape is chosen in order to allow a uniform distribution of the stresses in the shell and a minimum shell weight. Although this latter parameter is not generally of fundamental importance, it is desirable with regard to spatial applications, for example, to achieve the same aims as in balloon envelopes. For ordinary applications, the reduction in weight and thus of the material used, is not to be neglected. In addition, ease of construction is sought and the use of easily weldable materials greatly contributes here.

The invention has attempted to resolve these difficulties by combining an optimal distribution of the forces in the skin of a container under pressure and a renewal of the stresses exercised by the pressure force, by a particular structure.

SUMMARY OF THE INVENTION

The process according to the invention is remarkable in that overall, the circumferential stresses are minimized in relation to the meridional stresses by adopting a spheroid-shaped structure flattened at either pole. The gores are distorted preferably in the meridional direction and transfer the greater part of the overall meridional stress they would be incapable of supporting $2y$ themselves, onto the special structure mentioned above.

The container obtained according to the procedure of the invention is remarkable in that it is made from an air-tight skin formed from gores made from a material with a low elastic modulus and a large capacity for plastic elongation in the meridional direction, and meridional reinforcements made from material with a high elastic modulus inter-connected to either pole.

BRIEF DESCRIPTION OF THE DRAWINGS

Other objects of this invention will appear in the following description and appended claims, reference being made to the accompanying drawings forming a part of the specification wherein like reference characters designate corresponding parts in the several views.

FIG. 1 is a perspective view of a container according to the invention.

FIG. 2 is a fragmentary view in partial cross-section of a structure of the invention on a level with a reinforcement.

DETAILED DESCRIPTION

The method of construction of a container having a symmetrical lobed structure, such as the one shown in FIG. 1, formed of gores 1 assembled along the meridians of the structure, consists of distorting the gores, preferably in the meridional direction, thus maintaining the length of the connecting lines unchanged, so that the structure has a spheroid shape flattened at either pole and a lobe of skin between the connecting lines reducing the circumferential radius of curvature. The detailed operating method enabling a symmetrical lobed structure to be obtained is as follows:

Gores are cut from a material with, at least in the longitudinal direction of cutting, gores with a low elastic modulus and a large capacity for plastic elongation.

The gores are preformed if necessary by bending their plane longitudinally.

The gores are assembled by their edges in order to obtain an isohedric structure.

Components which are practically one-dimensional with a high elastic modulus are fixed on a level with the connecting lines of the gores and along the meridians.

The components are inter-connected at either pole.

The lobed structure is formed by creating an overpressure inside the structure.

FIG. 1 shows a method of construction in the case of a pressurized balloon. This balloon has a skin formed from gores 1 cut from sheets of material with a low elastic modulus and a large capacity for plastic elongation at least in the meridional direction.

On the meridian section shown at the lefthand side of FIG. 2, the gores 1 are seen to be assembled in edge-to-edge relationship by means of a tape 2 made from the same material as the gores and bonded thereto by heat-welding on both sides of the edges 3 of adjacent gores. The skin thus achieved can be tight or made tight by coating or thanks to a flexible bladder.

Reinforcements 4 are secured above the assembly lines through a superficial bond designed to keep them in position before the curving of the gores. This bond can be a pinpoint one.

The meridional reinforcements 4 are made from a material with a high elastic modulus, in the form of practically unidirectional components, such as cables or bands. These reinforcements may also be made from a mono-orientated material.

As an example, the material from which the gores 1 and the assembling tapes 2 are cut may be a polyethylenepolyester complex formed of "TERPHANE" type polyester sandwiched between two polyethylene layers, whereas with such a material, it will be possible to use meridian reinforcements 4 made of aramid fiber whose lengthening capacity is but a small fraction of that of polyethylene and polyester.

The gore ends are welded in a known manner over polar caps 6.

The ends of the components 4 are attached, for example by sewing, onto rings made from a light alloy, surrounding the poles of the balloon.

Other ways of maintaining the ends of the unidirectional and/or mono-orientated components are possible. Among these, one can cite for example, the welding of the ends to each other at either pole, the construction of components forming closed rings passing through the poles and encircling the envelope, the continuous winding of a component along the meridians.

When the balloon is submitted to an overpressure, the gores are maintained along their connecting lines by the unidirectional components 4, while their surfaces are distorted to form lobes. The skin is thus strained in an almost uniform way to a value close to its elastic limit, while the reinforcements are submitted to a tensile stress equal to their operating limit.

According to the construction described above, the welding of the gores presents almost the same mechanical characteristics as the gore itself. Nevertheless, one can, according to another method of construction, incorporate a unidirectional and/or mono-orientated component during the connecting of the gores, the features of which are equivalent to those of the reinforcements and thus avoid the presence of exterior reinforcements. However, this technique requires more delicate construction and can only be envisaged in special cases.

According to a method of application for pressurized containers, the gores are cut from sheets of soft steel, then bent longitudinally in their plane in order to allow them to be assembled by welding. An isohedric structure is thus obtained onto the angles of which unidirectional components, cables or bands, are fixed, made of high-resistance steel or of a metal with a high elastic modulus, such as titanium. One then injects a fluid under pressure, hot if necessary, into the structure in order to obtain a distortion of the skin identical to that which will be present during use.

According to another example of the construction, the material used for the skin is a light alloy, the reinforcements perhaps being made of composite materials with a carbon, boran base, etc.

The materials used for the construction of the container will be determined according to their mechanical properties and their cost price.

The advantages presented by the invention with regard to conventional techniques are revealed, for example, by comparing a conventional spherical balloon with a volume of 214 m³ made of polyester 60 micrometers thick and 7.40 meters diameter, weighing 19 kilograms, to a lobed balloon, according to the invention, of the same volume and weight.

|  | Spherical balloon | lobed balloon | % gain |
| --- | --- | --- | --- |
| Maximum operational overpressure | 35 mbars | 50 mbars | 42% |
| Bursting pressure | 50 mbars | 75 mbars | 25% |

It can be seen from the table that it is possible to construct structures with better characteristics or to obtain structures with smaller volumes equivalent to conventional structures.

We claim:

1. A container with an axially symmetrical sturcture adapted to support an overpressure, said container comprising:
   (a) an airtight skin having two poles and being formed from gores assembled at connecting lines extending along meridians of the structure, and
   (b) meridional unidirectional reinforcement means disposed along the meridian connecting lines and interconnected at either pole,
   (c) the gores being made of a material with a low elastic modulus and a large capacity for the plastic elongation at least in the meridional direction thereof,
   (d) the reinforcement means being made of a material with a high elastic modulus adapted to be plastically deformed outwrdly while maintaining their initial length,
   (e) the combination of the materials used to form the gores and reinforcements being effective that, when an overpressure is created inside the structure, the gore material, plastically deforms to cause bulging along the length of the connecting lines and the container is inflated in a lobed, symmetrical spheroid form along the length of the connecting lines and is flattened at either pole.

2. A container is defined in claim 1 wherein the meridional reinforcement means comprise reinforcement members attached at least at intervals to the skin in line with the connecting lines of the gores.

3. A container as defined in claim 1 wherein polar caps are located at the two poles, and the ends of the gores are fixed to the polar caps.

4. A container as defined in claim 2 wherein rings are located at the two poles, and the meridional reinforcement members are fixed by their ends to rings.

5. A container as defined in claim 2 wherein the gores and the meridional reinforcement members are made of metal.

6. A container as defined in claim 1 wherein the gores and the meridional reinforcement means are made of plastic.

7. A container as defined in claim 6 wherein the plastic material of the gores is composed of a central polyester layer and two external layers of polyethylene.

8. A container as defined in claim 7 wherein the meridional reinforcement means consist of bands of arylamide fiber.

9. A container as defined in claim 1 wherein the material forming the reinforcement means comprises a unidirectional and/or mono-oriented component incorporated into the connecting lines between the gores.

10. A container as defined in claim 1 wherein the material forming the gores includes unidirectional and/or mono-oriented material located along the connecting lines to form the reinforcement means.

* * * * *